Oct. 16, 1923.  
C. F. MILLER  
1,470,997  
LEATHER STITCHING MACHINE  
Filed March 5, 1921  9 Sheets-Sheet 1

Oct. 16, 1923.  
C. F. MILLER  
1,470,997  
LEATHER STITCHING MACHINE  
Filed March 5, 1921   9 Sheets-Sheet 5

Patented Oct. 16, 1923.

1,470,997

UNITED STATES PATENT OFFICE.

CHARLES F. MILLER, OF CHICAGO, ILLINOIS, ASSIGNOR TO CHICAGO SHOE MACHINERY COMPANY, OF CHICAGO, ILLINOIS, A CORPORATION OF ILLINOIS.

LEATHER-STITCHING MACHINE.

Application filed March 5, 1921. Serial No. 450,036.

*To all whom it may concern:*

Be it known that I, CHARLES F. MILLER, a citizen of the United States, residing at Chicago, in the county of Cook and State of Illinois, have invented certain new and useful Improvements in Leather-Stitching Machines, of which the following is a specification.

This invention relates to new and useful improvements in wax thread leather stitching machines of a type which is more particularly intended for use in manufacturing and repairing shoes, but which is applicable for use in making and repairing harness, and for sewing other leather articles, and it consists in certain peculiarities of construction, novel arrangement and combination of the various parts thereof as will be hereinafter more fully set forth and claimed.

Some of the objects and special features of the invention are as follows:

To provide a rotary hook with a measuring device actuated by the loop of needle thread passing there-around, for pulling a predetermined amount of thread from the bobbin whereby each stitch will be set without imparting a sudden strain on the bobbin thread.

To provide a novel means for measuring a predetermined amount of needle thread for each stitch, which means co-operates with a thread thrower in positioning the thread for engagement by the hook of the needle.

To provide a positively actuated device for intermittently nipping the needle thread at the time each stitch is being set so as to prevent the thread from being pulled from the supply, thereby insuring the formation of very tight stitches.

To provide a thread placer which oscillates about an inclined axis whereby the same will engage and lift the needle thread from the hook of the needle so as to avoid said hook catching the thread, and then carrying said thread in a looped formation into a position to be engaged by the shuttle.

To provide a novel means for supporting the bobbin case within the hook, and to provide co-operating means for ejecting the bobbin case whenever desired to refill the same.

To provide a brake mechanism so as to prevent the various moving parts of the machine from being moved in the reverse or wrong direction.

To provide means for adjusting the normal position of the feeding awl so as to insure the proper alignment of the same relative to the needle, whereby the latter will, with certainty, enter the hole in the work made by the awl.

To provide a novel means for imparting friction between the bobbin race and the bobbin to sufficiently retard the unwinding of the bobbin.

To provide means for readily connecting and disconnecting the belt wheel to and from the main shaft of the machine.

To provide a two-part rotary cam for actuating the thread take-up arm whereby the timing of said arm may be varied.

To provide a wax-pot with a plurality of thread chambers whereby a plurality of threads may be inserted for successive use without becoming tangled one with the other.

The above mentioned, as well as other objects, will in part be obvious, and will be fully explained hereinafter.

In the accompanying drawings, which serve to illustrate an embodiment of the invention, and in which like characters of reference designate similar parts throughout the different views.

Figures 18, 19:
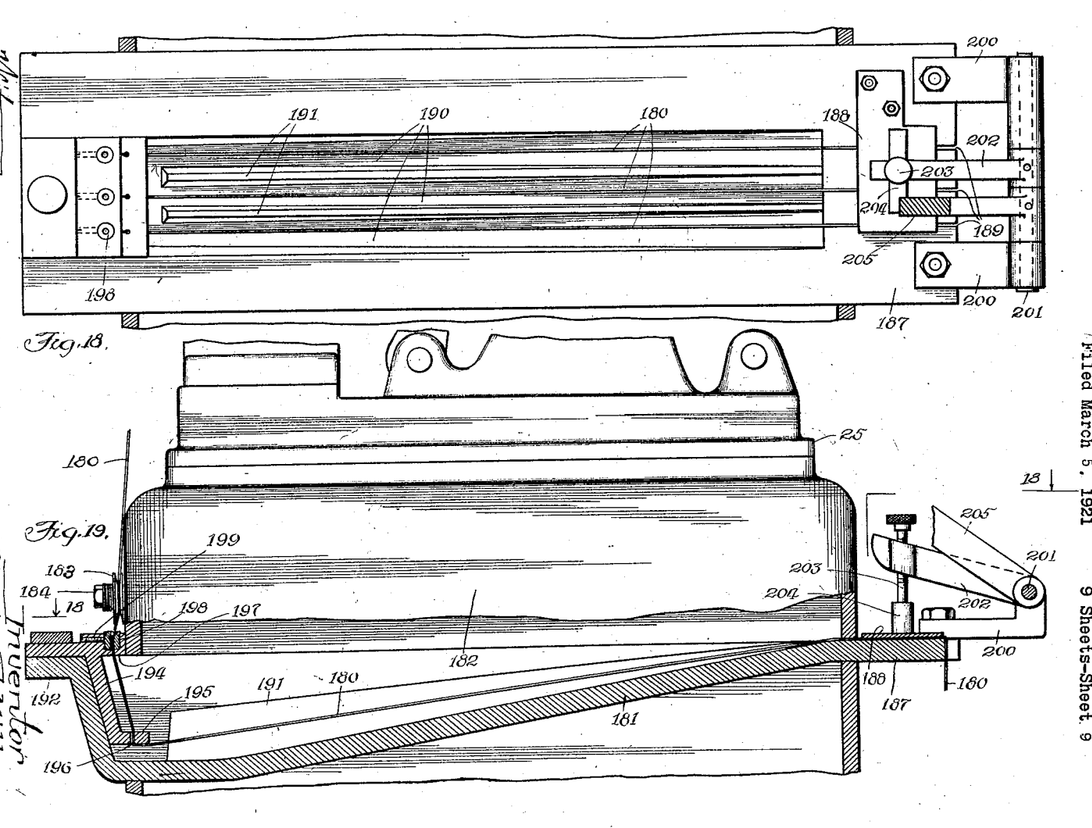
Figure 18 is a plan view taken on line 18—18 of Figure 19 showing the wax-pot and the thread lock.
Figure 19 is a view partly in section and partly in elevation of a portion of the casing for the wax-pot, with said pot therein, mounted on the base of the frame of the machine and illustrating the disposition of a plurality of threads in the pot and the lock for said threads.

Referring now more particularly to Figures 1 to 7 inclusive, and Figure 19 of the drawings, the reference numeral 25 designates the base of the frame of the machine, which frame comprises a pair of spaced uprights 26 and 27 located near the side edges of the base rearwardly of its transverse medial line, on which, in suitable journal boxes 28, the drive shaft 29 is transversely and horizontally journaled. The frame also includes a pair of spaced uprights 30 and 31 located at the front end of the base and extended somewhat forwardly of said end. The upper portion of the upright 30 is enlarged, and, by preference, provided with a steam chamber casing or dome 32 (see Figure 9) for the purpose of receiving steam or heated fluid from any suitable source, employed for keeping parts of the machine at a proper temperature. At a suitable distance above the base 25 each of the uprights 30 and 31 has secured to its front surface a forwardly extending angle bracket 33 on which is horizontally mounted and secured a work support or throat-plate 34. This plate or support is provided with an elongated opening 35 for the reception of the awl and needle, and, as will be presently explained, the work is fed along the plate 34 in a transverse direction to the machine, and for this reason the slot or opening 35 is located parallel with the driving shaft.

Located above the plate 34 so as to co-operate with the work thereon is a presser foot 36 which is in the nature of a rocker-arm. This arm is connected to another arm 37 by a rod 38, and said arms are journaled on the upright 30, see Figures 5 and 8. A cam disk 39 is mounted on the shaft 29, and has its entire periphery, with the exception of a cam notch 40, arranged concentrically with respect to said shaft.

Journaled on the upright 30 between the arm 37 of the presser foot and the driving shaft 29 is a pin or short shaft 41 on which is journaled one end of an arm 42, the other end of which extends under and engages the arm 37. Another arm 43 is journaled on the stub shaft 41 and extends under and normally engages, by preference, with a roller which it carries, the periphery of the disk 39. The arm 43 has mounted thereon and near its pivot an upward extension 44 in which is threaded an adjusting screw 45 which has a head 46 to be used for turning the same. That end of the arm 42 adjacent its pivot extends under the extension 44 and lower end of the screw 45. By this arrangement it will be seen that by adjusting the screw downwardly, the arm 42 will cause the arm 37 to be moved upwardly and thereby force the presser foot 36 downwardly onto the work. A spiral spring 47 secured at one of its ends to the arm 37 near the tie rod 38 and at its other end to the base 25 serves to hold the roller 44ᵃ carried by the arm 43 in contact with the periphery of the disk 39, so that once during each cycle or revolution of the disk the cam notch 40 therein will coincide with and receive the roller 44ᵃ on the arm 43 and thereby relieve the pressure on said arm and thus remove the pressure from the presser foot.

An awl 48 carried by an arm 49 fixedly secured to a shaft 50 horizontally and transversely mounted on the uprights 30 and 31 parallel with and rearwardly of the work support 34 co-acts with the said support and presser foot. One end of this shaft is located in a bushing 51 on which the presser foot 36 and the arm 37 tied thereto is mounted, see Figure 8. The shaft 50 is mounted for longitudinal movement as well as an oscillatory movement and as the arm 49 which carries the awl is fixed thereon it is manifest that it will be moved from a point below the work support 34, upwardly through the opening 35 of the throat plate 36, so as to pierce the work 52. A spring 53 secured at one end to the upright 30 and resting at its other end against the end of the shaft 50 serves to return said shaft after it has been shifted towards said spring so as to cause the awl 48 to positively feed the work 52 a distance equal to the length of one stitch. When this feeding operation of the awl takes place it will be understood that the pressure of the presser foot has been relieved or released. To oscillate the shaft 50 and thereby the awl 48, said shaft has mounted thereon and extended rearwardly therefrom an arm 54, which is pivotally connected to the front end of a link 55, the other end of which is similarly secured to the front end of an arcuate arm 56 which carries between its ends a laterally disposed roller 57 and is fulcrumed at its rear end to the base of the machine. The roller 57 operates in a cam groove 58 with which a disk 59 fixed to the driving shaft is provided in one of its faces. The groove 58 is so shaped that the awl will be held in its retracted position for the greater portion of each cycle and so that the awl will remain in the work 52 during the feeding action thereof.

A lever 60 is employed to shift the shaft 50 against the tension of the spring 53, and said lever is fulcrumed on the upright 31 as at 61 and extends rearwardly of its fulcrum and carries on its rear portion a roller 62 which is intermittently engaged by a cam block 63 fixed to the outer face of the hub 64 of a split or adjustable cam. In the rotation of the hub 64, which is fixed to the drive shaft 29, the block 63 will, during each revolution of said hub, engage the roller 62, thus causing the lever 60 to turn on its pivot 61 and thereby move the shaft 50 endwise against the spring 53, this movement taking place, as before explained, while the awl is in the work and while the presser foot has been released of its pressure. The cam block 63 is of such length that the roller 62 will be freed from engagement with said block as soon as the feeding stroke of the awl has been completed, thus permitting the spring 53 to exert its tension against the shaft 50 and to shift it to its first position.

Figure 1:
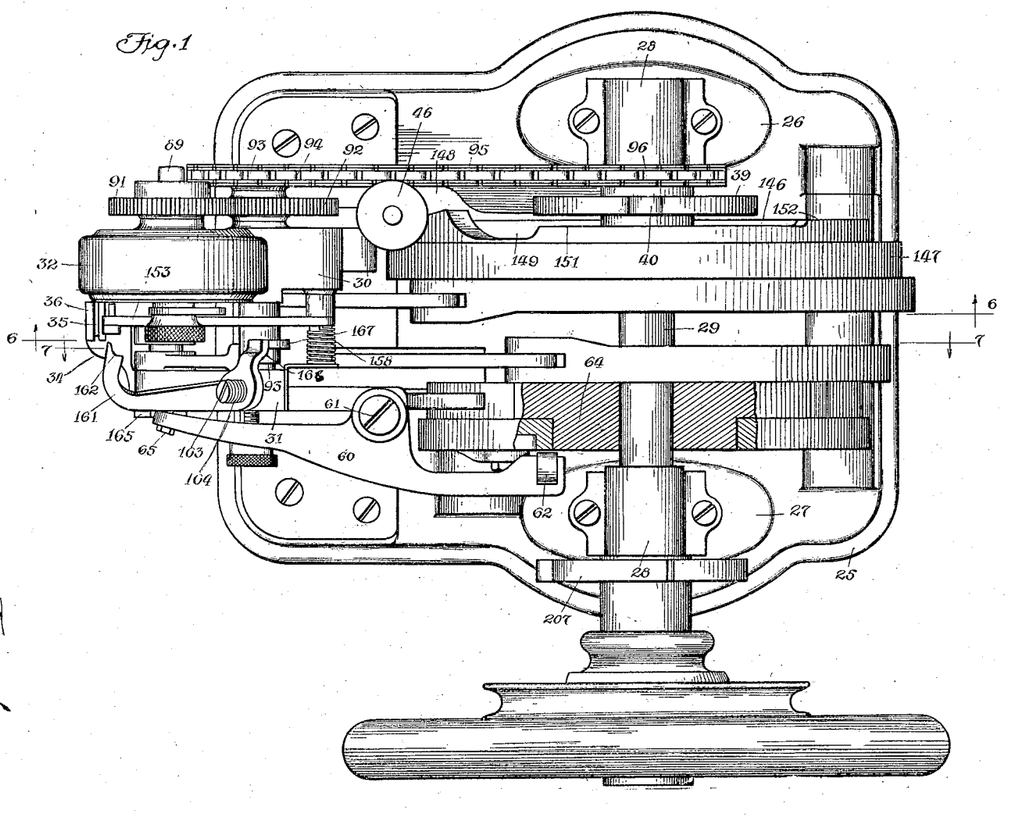
Figure 1 is a plan view of the machine, showing a part thereof in section.
Figure 2:
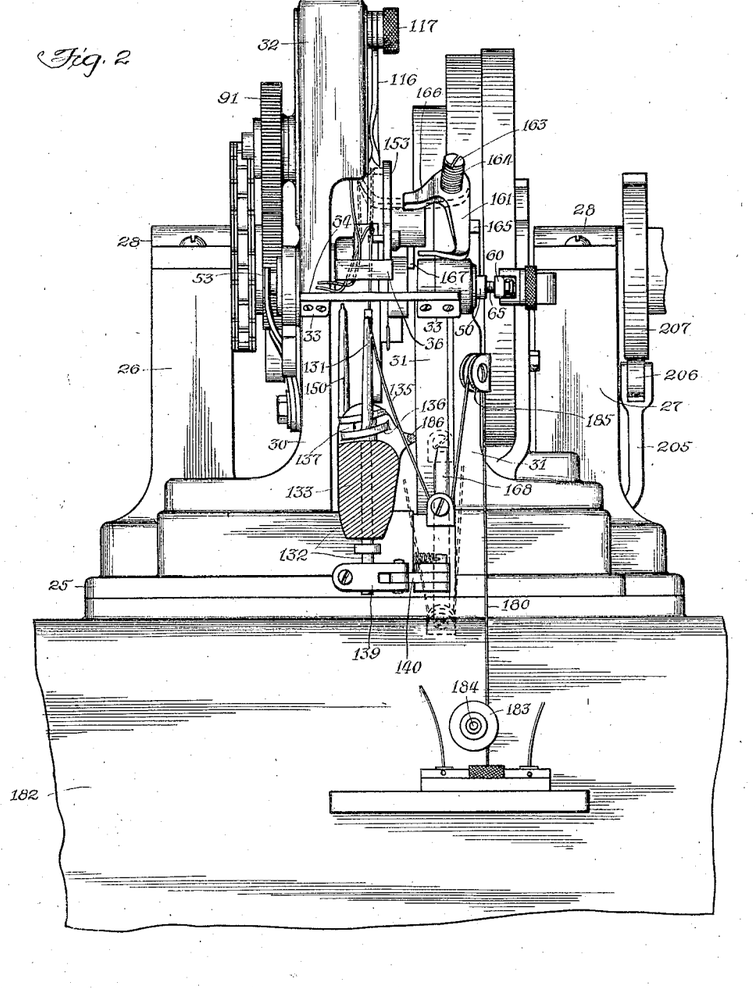
Figure 2 is a front view in elevation of the machine, showing a fragment of the casing of a wax pot mounted on and depending from the base of the machine and illustrating about the initial positions the threads and threaded parts will occupy when work is begun.
Figures 3, 8:
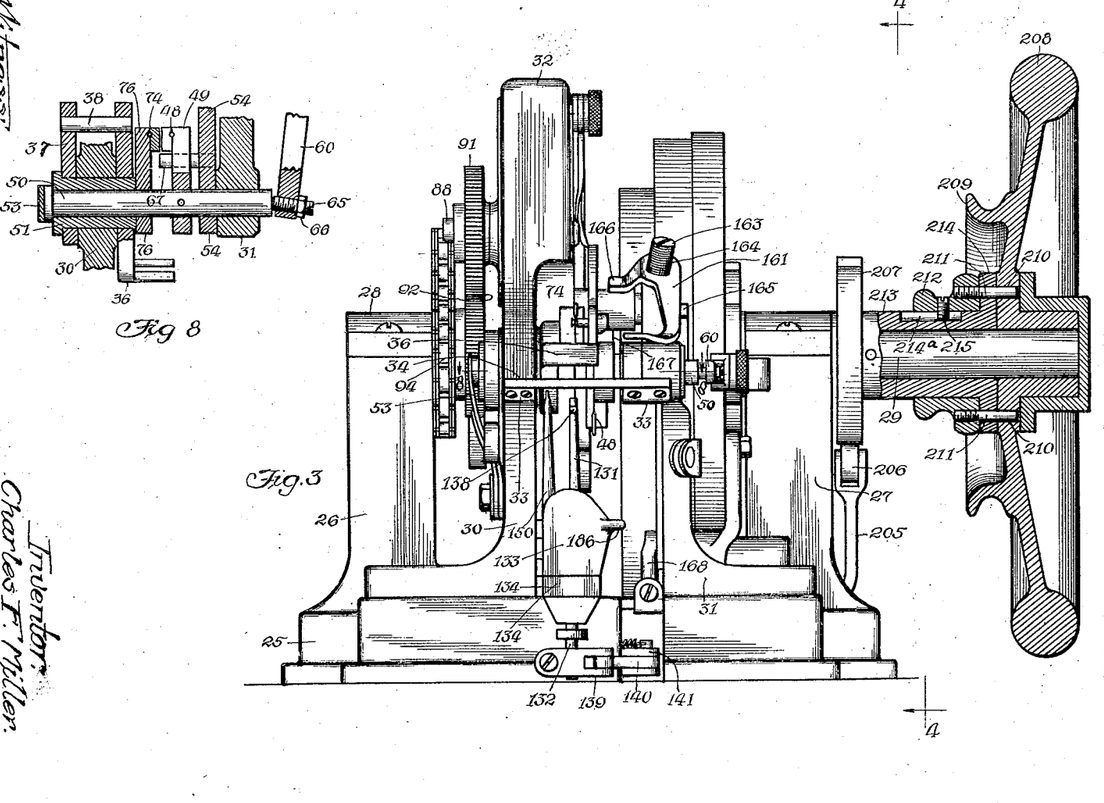
Figure 3 is a similar view with the threads and wax pot casing omitted, illustrating the drive or fly wheel and clutch in section.
Figure 8 is a plan section taken on line 8—8 of Figure 3, showing the feeding mechanism and means for adjustment of the same.

By reference to the drawings, particularly to Figures 1, 2 and 8 thereof, it will be seen that the front end of the lever 60, has threaded therein a transversely disposed adjusting screw 65, one end of which contacts with the adjacent end of the shaft 50 while the other end has mounted thereon a nut 66 to lock it in its adjusted position. By this arrangement the shaft 50 and awl can be adjusted so that the latter will be truly aligned with the needle.

Again referring to Figure 8, it will be seen that the arm 54 has extended laterally therefrom a stub shaft 67 which passes through an opening in the arm 49 which carries the awl, which construction permits of independent sliding movement of the shaft 50 and arm 49, while the arm 54 has a rocking movement only.

Figure 7:
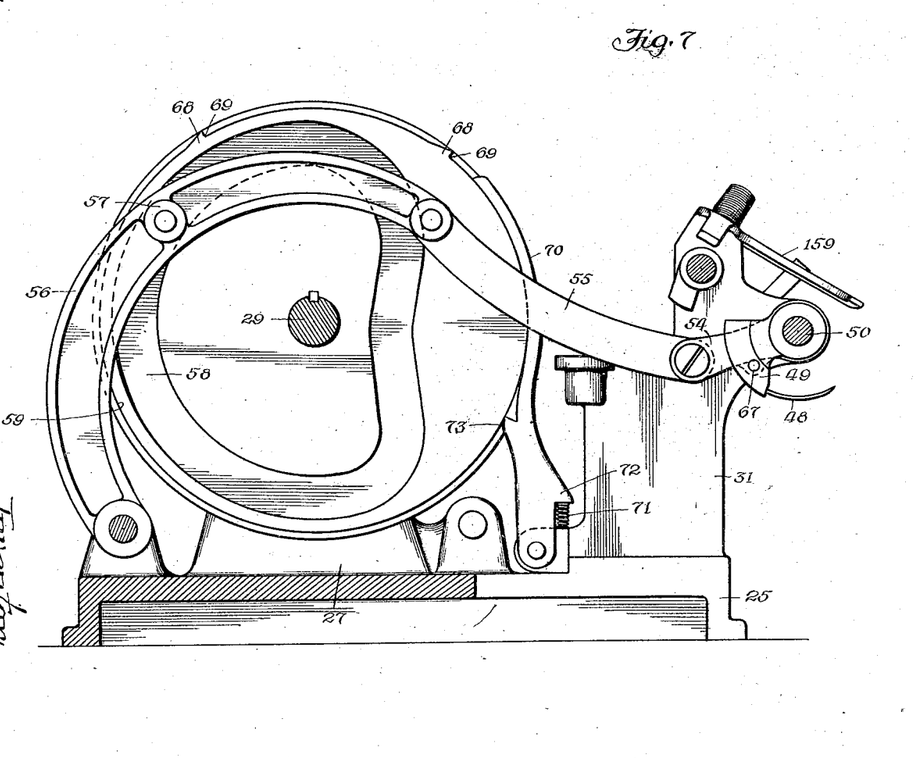
Figure 7 is a similar view taken on line 7—7 of Figure 1.

By reference to Figure 7, it will be seen that the cam disk 59 is provided on its periphery with a plurality of spaced lugs 68 which terminate abruptly or with a shoulder 69 towards the front of the machine, and that a brakeshoe 70 pivoted at its lower end to the upright 31, extends upwardly along the front part of the periphery of said disk. This brake is normally held in contact with the disk 59 by a spring 71 interposed between a projection 72 on the lower front portion of the brake and the part to which it is pivoted. The lower rear part of the brake 70 has an extension 73 adapted to engage one of the walls or ends 69 of one of the lugs 68, should the upper end of the brake fail to engage said wall in the backward or wrong movement of said disk. This arrangement of parts will prevent the reverse or backward movement of the machine to an extent to cause damage thereto, or interfere with its proper operation, yet will offer no hindrance to its operation in the proper direction, as is obvious.

When the awl has finished its feeding operation and has been withdraw from the work 52, an opening will be left in the latter to be entered by a needle 74, which has a hook 75 near its point. This needle is carried by an arm or holder 76 which is journaled on the shaft 50, see Figure 8. This holder 76 is provided with a rock arm 77 which, in turn, is pivotally connected to one end of a link 78, the other end of which link is pivotally connected as at 79, see Figure 6, to one end of a bell crank lever 80 which overlies the drive shaft 29 and is fulcrumed at its angle to a pivot 81 on the base 25. The lever 80 is provided with a short arm 82 which extends forwardly and under the shaft 29. A roller 83 is journaled on the front end of the shorter arm 82 and engages a cam groove 84 formed in a cam disk 85 which is fixed on the drive shaft.

Attention is here called to the fact that the position of the roller 83 is opposed to the position of the roller 57, see Figure 7. The cam groove 58 of the awl actuating mechanism and the cam groove 84 of the needle actuating mechanism, are of such shapes as to time the awl and the needle, whereby the awl will not leave the work until the point of the needle has entered the opening made by the awl.

From the foregoing, it will be seen that the cam groove 84 will, through the roller 83, rock the lever 80 and this lever, through the link 78, and the rock arm 77, oscillate the needle. The cam groove 84 is so shaped as to give the needle a period of rest while the awl is performing its feeding function.

A rotary hook 86 is mounted in a recess 87 in the upper part of the upright 30 on the face thereof adjacent the upright 31 and below the steam chamber or dome 32 as will be clearly understood by reference to Figures 9 and 10 of the drawings, and co-operates with the hooked needle. This hook is rotated by means of a shaft 88 journaled in the upright 30. On that end of the shaft adjacent the recess 87 in the upright 30 is mounted a disk 89 which has extended therefrom in an opposite direction from said shaft, a segmental projection 90. On the opposite end of the shaft 88 is a gear 91 which is driven by a gear 92 journaled on a shaft 93. Fixed to the gear 92 is a sprocket wheel 94 which is driven by a sprocket chain 95 from a sprocket wheel 96 fixed to the driving shaft. The hook 86 is formed with a bobbin race and is provided centrally within the same with a hollow supporting pin 97 for the bobbin case. Rotatably mounted within the bobbin race and on said pin 97 is a bobbin 98 which has in its inner wall and near its hollow bearing 99 and opening 100, through which the inner end 101 of the bobbin thread 102 is extended and positioned between the inner wall of the bobbin and the wall of the bobbin race, to act as a drag to prevent too free rotary movement of the bobbin in the unwinding of the thread therefrom. Surrounding the bobbin is the bobbin case 103, which is provided centrally within its cavity with a spindle 104, fitted in the hollow supporting pin 97, thereby forming a bearing for the bobbin case. This case is provided on its outer surface with an elbow shaped rib, designated as a whole, by the numeral 105. This rib is cross-sectionally rounded and comprises a long portion 106 and a short portion 107 integrally united.

Figures 9, 10:
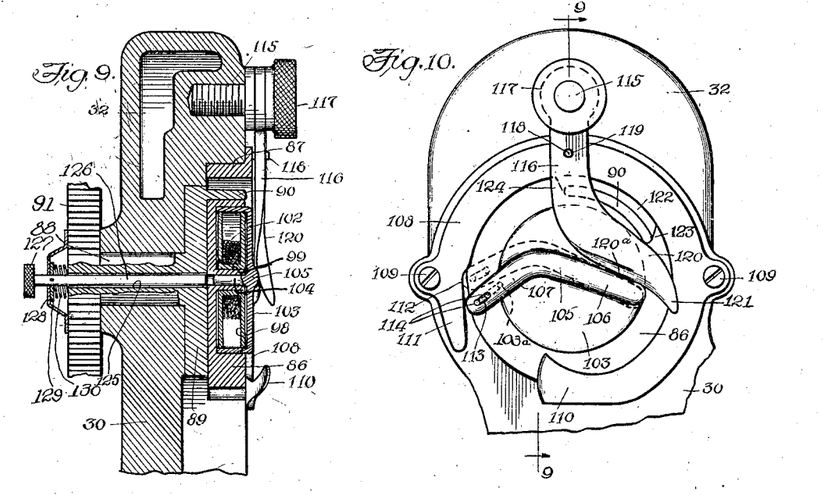
Figure 9 is a vertical sectional view taken on line 9—9 of Figure 10 showing the rotary shuttle, its mount, the bobbin, its case and the relative positions of certain elements of the thread measuring device.
Figure 10 is a face view of said parts.
Figures 11, 12:
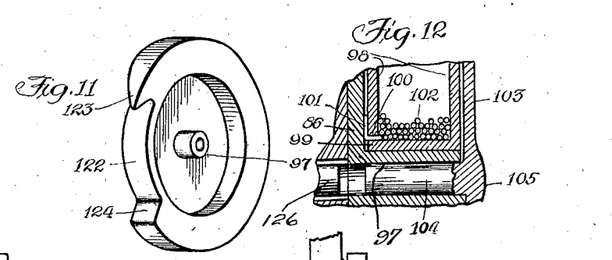
Figure 11 is a detached perspective view of the shuttle.
Figure 12 is an enlarged sectional view of the central portions of the shuttle, bobbin and casing therefor, showing the bobbin constructed for and equipped with a fiber drag.
Figure 13:
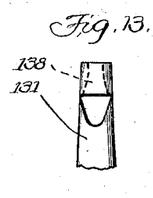
Figure 13 is a face view of the upper portion of the thread thrower showing the construction of the eye therein.

As will be observed by reference to Figure 10, the main portion or the longer part 106 of the rib 105 is located diametrically with respect to the case 103, and the shorter portion 107 of said rib is deflected obtusely from the portion 106 to which it is united and extends slightly beyond the annular wall of the bobbin race and near one end of a circular retainer 108 for the latter. This holder is secured to the face of the upper portion of the upright 30 by means of screws 109 so that it can be readily removed for withdrawal of the rotary hook when necessary. The lower end of the retainer 108 is provided with an outwardly deflected portion 110 and its other end portion 111, which end portion lies closely against the face of the upright 32 and extends downwardly thereon, is provided in its inner edge with a cutaway portion 112, see Figure 10, for the purpose to be presently explained. The shorter portion 107 of the thread measuring rib 105 is hollow at its outer extremity and is provided on the outer face of said hollow portion with a longitudinally extended depression 113 at each end of which is provided an opening 114 for the bobbin thread, which is first threaded through the inner opening 114 and thence through the outer opening 114. Mounted on a screw 115 threaded into the upper portion of the support 32 above the rotary hook is an arm 116 which may be locked in position on the screw 115 by a milled nut 117 engaging said screw and prevented from lateral movement by means of a pin 118 extended outwardly from the upper portion of the retainer 108 through a suitable opening 119 in said arm. This arm performs the double function of assisting in measuring the bobbin thread and in operatively holding the bobbin case 103 at all times in the operation of the machine. As shown in Figures 9 and 10, the arm 116 depends vertically across the upper portion of the bobbin case, but out of contact therewith and from thence is provided with a laterally deflected portion 120, the free end 121 of which is deflected outwardly from the bobbin case 103. The lateral deflected portion 120 of said arm has its lower edge formed with a compound curve, see Figure 10, and a short portion of said curved edge contacts with the rounded upper portion of the part 106 of the thread measuring rib 105, at a point between the end of the longer part 106 and the axis of the casing, as at 120ª. The rotary hook 86 has a cut-away portion or recess 122 in its periphery. At one end of this peripheral recess the hook is provided with a horn 123 and at its other end with a shoulder 124, between which shoulder and horn the extension 90 carried by the shaft disk 89 is located to engage the shuttle and impart rotary motion thereto.

In order to provide convenient means for removing the bobbin case and bobbin, the shuttle shaft 88 is provided with a central opening 125 which communicates at its inner end with the hollow supporting pin 97 and has located therein a rod 126 which extends at its inner end to about flush with the face of the disk 89 and at its other end beyond the outer end of the shaft 88 and has on said outer end a head 127 used for operating said rod. Secured around the outer end of the shaft 88 is a housing 128 through which the rod 126 is extended, as is clearly shown in Figure 9. Inwardly of the housing 128 a disk 129 is fixed to said rod, and interposed between said disk and the adjacent end of the shaft 88 is a coiled spring 130 which will normally hold the rod in the position shown.

When it is desired to remove the bobbin case, the arm 116 can be loosened and moved aside and by pressing on the head 127 of the rod 126 said rod will be caused to pass through the hollow supporting pin 97, and contact with the spindle 104 of said bobbin case, when, by further inward pressure of said rod, the case will be forced from its seat. After the rod is freed of pressure the spring 130 will return it to its normal position.

Figure 14:
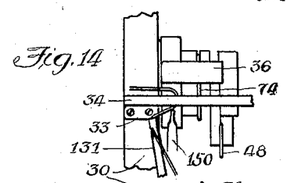
Figures 14 to 17 inclusive are diagrammatic fragmental face views of the front part of the machine taken at the work support, showing various positions of the thread thrower, thread, awl, needle and thread measuring arm.
Figures 15, 17:
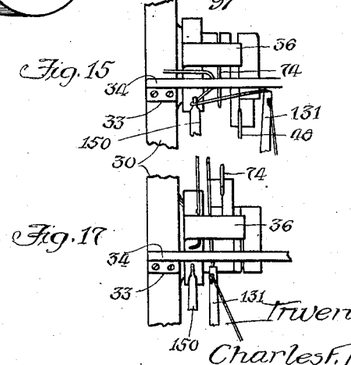

It will be observed that the axis of the hook shaft 88 is disposed in a plane parallel with the line of feed of the work, and also that the needle oscillates in a vertical plane at one side of the shuttle, and the axis of this needle oscillation is parallel with the line of feed and with the hook shaft. Furthermore, it will be noted that when the needle is in the work and is at the extreme lower position, it becomes necessary for the hook 75 of the needle to engage the lower thread extending from the last stitch. For this purpose, I have provided a thread thrower or positioning device which comprises a finger or member 131 carried by a shaft 132 vertically journaled in a block 133 which is supported on a forwardly extended support 134 mounted on the upper portion of the base 25. The upper rear portion of this block is provided with a track consisting of a pair of spaced and spirally formed guide flanges 135 and 136, see Figure 2, located one above the other. The upper end of the shaft 132, to which the thread thrower 131 is connected, is enlarged as at 137 and is located within the curves of the flanges or guide members 135 and 136 as is clearly shown in Figures 2 and 5. The thread thrower 131 is upwardly curved from its connection with the enlargement 137 on the shaft 132, and extended between said guides, and has at its upper end a thread receiving eye 138, which is downwardly flared for convenience of inserting the thread. The lower end of the shaft 132 extends through and somewhat below the support 134 for the block 133 and has securely fixed on its lower portion a laterally extending arm 139, to one end of which is pivoted one end of a link 140, the other end of which is pivoted to an arm 141 which is rigidly secured to a shaft 142 vertically journaled in the base 25. Connected to the arm 141 at its pivot is one end of a spring 143, the other end of which is connected to the front part of the base at one side of the link 140 so as to exert its tension against the arm 141 when it is turned from the spring. Fixed on the upper end of the shaft 142, is another arm 144, which is disposed oppositely to the arm 141 and carries at its free end an upwardly positioned roller 145, located to operatively contact with an annular cam race 146 on a disk 147 fixed to the shaft 29. The race or track 146 is in the form of an outstanding annular flange on one face of said disk, and is of such construction as to cause the roller 145, through its connections with the member 131, to partially rotate and shift it to a plurality of positions during each cycle, in some of which movements it will be elevated to properly place the thread into the hook of the needle, thus permitting shorter strokes of the latter and increasing the rapidity of stitch forming. The elevating movement of the member 131 is accomplished by the spiral track, and to permit of such movement, a small amount of vertical play is allowed the link 140 at its connection with the arm 141. When the roller 145 rides over the widest portion 148 of said cam race and drops into the depression 149 thereof, the member 131 will carry the thread to about the position shown in Figure 14 in front of the thread measuring finger 150, and when it rides out of said depression onto the step 151 of the cam race it will be caused thereby to move to the position shown in Figure 15.

Figure 16:
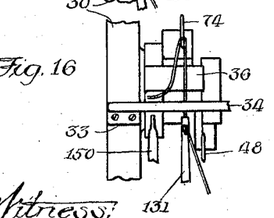

In this movement the finger 150 will engage, with its notched upper end, the thread which will thus have been thrown upwardly into position to be engaged by the hook of the needle. This measuring finger 150 is pivoted at its lower end to the support 134 and extends forwardly and upwardly to near the work support, see Figure 6, and has pivoted to its lower portion one end of link 150ª, which carries at its other end a roller 159, which roller engages a cam groove 160 in the cam disk 85. This groove is of such construction that during each cycle, the link 150ª, as well as the finger, will be pushed forwardly in two quickly successive movements, the first of which causes the finger to engage the thread when being thrown from the position in Figure 14 to the position shown in Figure 15, by the thread thrower 131, and the second of said movements causes the release of the thread from the measuring finger to permit it to be drawn upwardly by the needle as shown in Figure 16. As the roller 145 passes onto the next step 152 of said cam race, the member 131 will be caused to occupy about the positions shown in Figures 16 and 17, or to be placed in alignment with the needle and then in alignment with the face of the shuttle.

In the foregoing movements, it will be understood that the lower thread will be positioned relative to the needle, whereby the hook in the needle will positively engage said thread and lift the same upwardly in a loop formation through a hole in the work previously made by the awl.

To assist the positioning of this loop of thread which is being carried upwardly by the needle to the rotary hook, I employ a thread lifter arm 153 which is disposed in close proximity to the needle and moves in a vertical plane only. The rear end of this arm is fulcrumed to the upright 30 as at 154, and extends forwardly from said fulcrum over the shaft 93 and thence forwardly towards the shaft 50, and from thence forwardly over said shaft, and terminates at a point above the work support 34. Fixed to the shaft 93 is a trip finger 156 which engages a downwardly extended shoulder 157 with which the arm 153 is provided. As the shaft 93 rotates, the trip finger 156 engages the shoulder 157 and swings the arm 153 upwardly so that the outer end thereof will be in position between the needle 74 and the horn or point 123 of the shuttle. After the trip finger has passed beyond the shoulder 157, the lifter arm 153 will return to its normal position, through the action of a coil spring 158 which is fixed at one end to the arm 153 and at its other end to the pivot 154. After the needle has moved upwardly and drawn the loop of thread therewith, the lifter arm 153 is then timed to move upwardly and engage the strand of the loop adjacent the pick-up arm and elevates said loop to a position above the needle. It will be noted, however, that the other strand of this loop is at this time still engaged by the notch 75 of the needle.

To further open this loop and to place it so that the horn 123 of the shuttle will accurately, and with certainty, enter it, a thread-placer 161, having a thread-engaging recess 162 in its free end, is pivoted near its rear end to the upright 31 to move in an inclined and slanting plane towards and from the shuttle. In order to accomplish this movement, the upper surface of the upright 31, is forwardly inclined and slightly slanted from the shuttle and the flat part of the placer 161 is fulcrumed thereon by a screw 163 seated in said surface of the upright. This fulcrum or screw is also inclined forwardly, as well as from the shuttle. A spring 164 coiled around the screw 163 and fastened at one end thereto and at its other end to the placer holds the latter in its normal position against a stop 165 fixed to the upright 31. The placer 161 is provided near its fulcrum with an arm 166 which is engaged by a trip arm 167 on the shaft 93. After the thread lifter 153 has positioned the loop of thread in the manner above explained, the thread placer 161 is moved laterally in an inclined plane towards the rotary hook by the trip arm 167 and arm 166, and caused to engage the strand of thread held by the notch of the needle and thereby distend said loop and cause the same to be held open and in proper relation to the rotary hook whereby the horn thereof will, with certainly, enter the loop.

From the foregoing, it will be observed that as the horn 123 picks up the loop of thread, one strand of this loop will be forced between the long part 106 of the rib 105 and the lower edge of the arm 116. Inasmuch as the arm 116 is stationary, the thread, when moved between said arm and the rib 105, will cause the bobbin case to be oscillated in a clockwise direction, to the position shown by dotted lines in Figure 10. This movement of the bobbin case will unwind a sufficient amount of thread from the bobbin for the next stitch to be formed. Thus, the means above described constitute a measuring device for the bobbin thread. As the hook continues its rotation, the loop of thread will be forced therefrom, and in the passage of this thread from the hook, said thread will engage the short arm 107 of the rib 105 and cause the bobbin case to be oscillated in a reverse direction, and returned to its normal position, as shown by the full lines in Figure 10.

Figure 4:
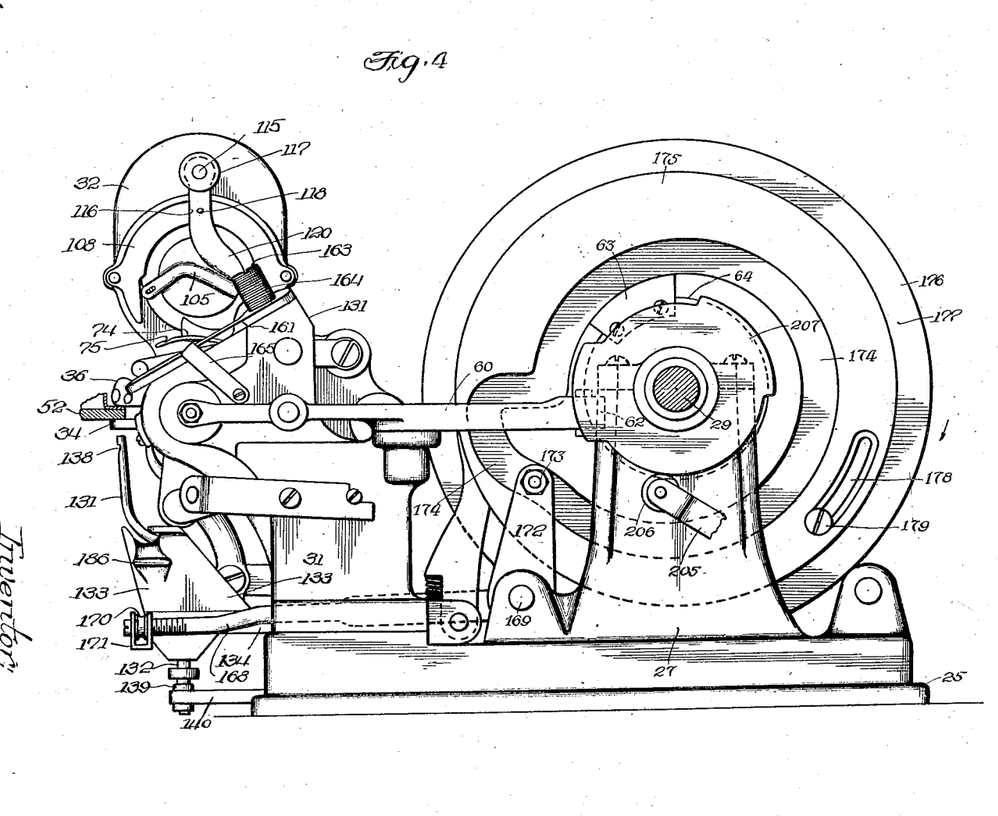
Figure 4 is a side elevation taken along the line 4—4 of Figure 3 as indicated by the arrows.
Figure 5:
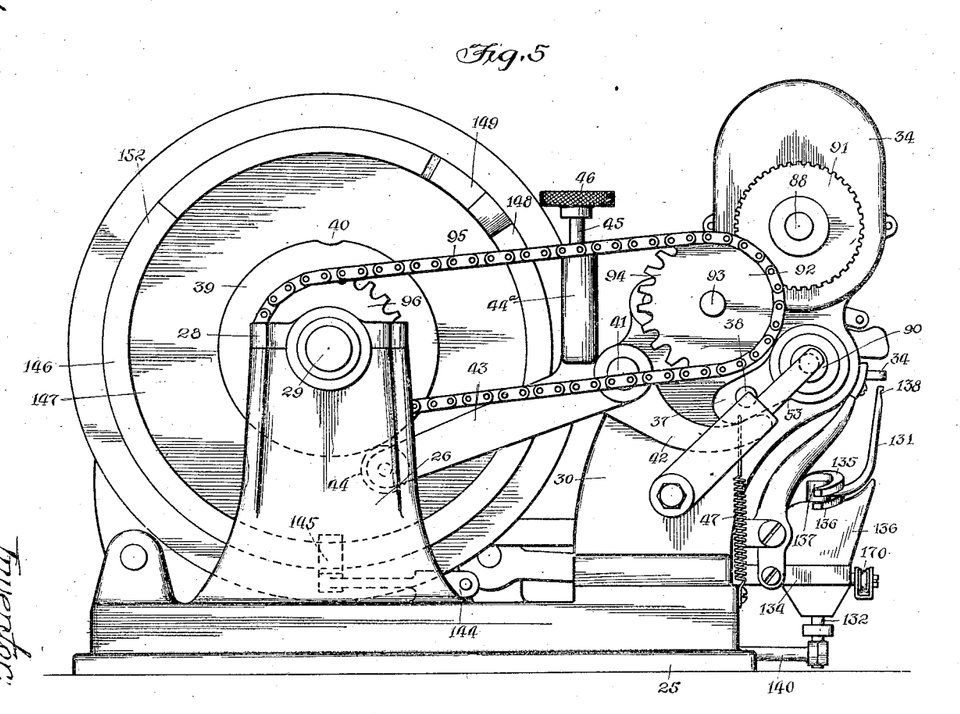
Figure 5 is a view in elevation of the opposite side of the machine.
Figure 6:
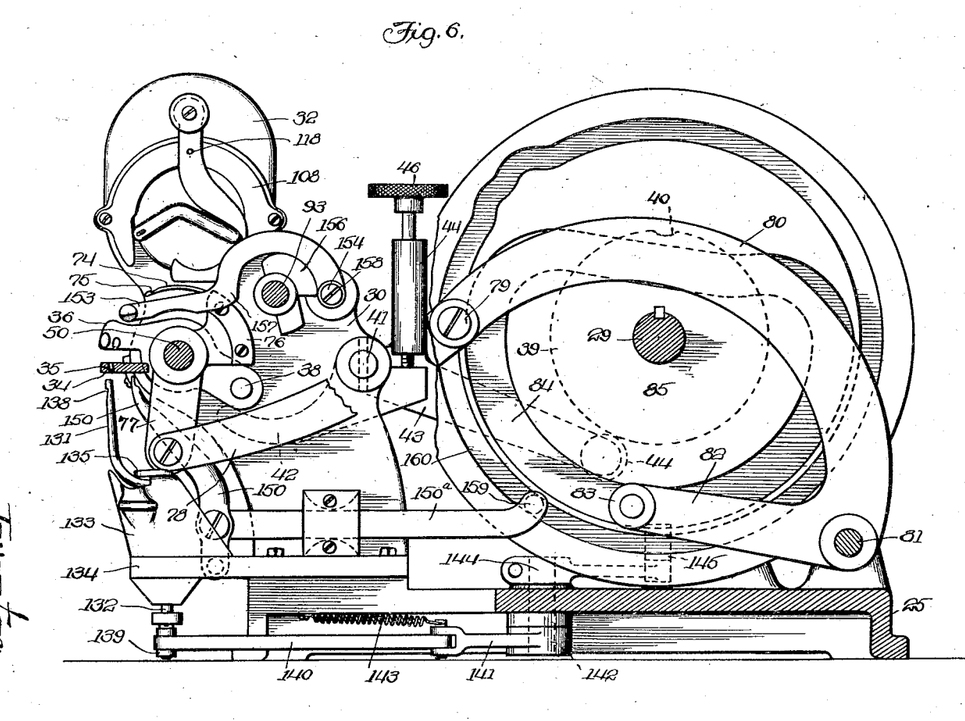
Figure 6 is a view partly in section and partly in elevation taken on line 6—6 of Figure 1, as indicated by the arrows.

To properly control the lower thread as well as to assist in setting the stitches, a take-up arm 168, see Figure 4, preferably co-acting with a thread nipping device, is employed. This take-up arm 168 is rigidly mounted on a shaft 169 transversely journaled on the lower portion of the upright 27 and extends forwardly below the block 133 but at one side of the support therefor, and has on its front end a transversely journaled thread carrying roller 170, which is, by preference, equipped with a guide bracket 171 depending from the member 168. Rigidly mounted on the shaft 169 is an upwardly extended arm 172 which carries at its upper end a roller 173 which engages a cam groove 174 in a disk 175, which is mounted on the hub 64 of a disk 176, which disk is provided with a peripheral flange 177 surrounding the periphery of the disk 175, and constitutes, with said disk, a split or adjustable cam. The disk 175 is provided with a segmental slot 178, through which is extended, and engages the disk 176, a screw 179 having its head countersunk in said slot. By this arrangement it is obvious that the disk 175 can be turned and set with respect to the disk 176 so as to properly adjust the position of the cam groove in the disk 175 to time the operation of the take-up arm 168 as may be required. The disk 176 is fixed to the driving shaft 29 and the groove in the disk 175 is eccentric to said shaft and so constructed that once in each cycle the take-up arm will be gradually raised at its front end until it reaches its uppermost position, as shown by full lines in Figure 2, when, by reason of the shape of the groove 174, it will be caused to descend with a quick movement to about the position shown by dotted lines in the last named figure, thus pulling down or placing stress on the lower thread from the loop or stitch and at the same time withdrawing thread from its source.

Referring to Figures 2, 18 and 19, the lower thread 180 is extended from a ball or its source (not shown) through a wax pot 181 which is mounted longitudinally within a boiler or furnace casing 182 mounted on the base 25 and depending therefrom. Said thread is extended upwardly from the front end of the wax pot, in a manner to be presently explained, between a pair of tension disks 183 mounted on a screw 184 on the front end of the casing 182, and from thence upwardly over a roller 185 mounted on a bracket secured to the upright 31, thence downwardly and over the roller 170 of the take-up arm and from thence upwardly through a loop 186 on the block 133 and thence through the eye 138 of the thread thrower arm 131.

The rear end of the wax pot, which pot has its bottom extended downwardly and forwardly, projects through the casing 182 and provides a platform 187, on which is secured thereto at one of its ends a leaf locking spring 188 which is adapted to lie on a plurality of threads 180, one only of which is to be used at a time. In order to hold these threads in spaced relation, the rear end of the platform is provided with a plurality of guide slots 189, which are so located as to align with a series of longitudinally extended compartments 190 with which the wax pot 181 is provided, by means of partitions 191 extended upwardly from the bottom of said part. As shown, these partitions terminate short of the front end of the pot for the purpose of affording communication between said compartments for the molten wax contained in the pot 181. The front end of the wax pot extends through the front end of the casing 182 and is provided with a platform 192 on which is secured, by means of a screw, a bracket 194 which extends downwardly into the pot 181, and has on its lower end a horizontally disposed flange 195 provided with a plurality of openings 196 for the threads 180, which threads are extended upwardly through suitable openings in a rearward extension 197 on the bracket 194 and through openings in plugs 198 seated in the upper surface of said extension. The plugs may be fixed in position by means of set screws 199 threaded in the extension 197 so as to engage the plugs 198 at their inner ends. By this arrangement it is obvious that the threads 180 will be prevented contacting with one another or adhering together or becoming entangled as they are to be located in separate compartments and held in independent positions. On the platform 187 near each side thereof is mounted an angle bracket 200 on which is journaled a shaft 201. Fixed at one of its ends to said shaft is an upwardly and forwardly extended arm 202. A screw 203 is carried by the arm 202 and engages, at its lower end, an enlargement 204, which extends longitudinally on the upper surface of the spring 188 and is fixed thereto. The screw 203 is employed to regulate the pressure of the spring 188 on the active thread 180 and as the arm 202 which carries said screw is fixed on the rock shaft 201, it is apparent that when said shaft is rocked, the pressure of the spring will be intermittently applied to the thread.

Fixed at one of its ends on the shaft 201 is an arm 205 which extends forwardly to a point under the driving shaft 29 and at the outside of the support 27, see Figures 3, 4 and 19, and carries at its front end a roller 206 which engages a cam 207 fixed on the driving shaft. In the rotation of this cam, the arm 205 will be intermittently depressed, thus causing the arm 202, through its screw 203, to intermittently apply pressure to the thread-locking plate 188, and thereby nip or lock the thread against being pulled from the supply. The thread will be nipped or locked when the take-up arm is in its lowermost position so as to set the stitch in a very tight manner and without pulling any thread from the supply at this time.

Loosely mounted on the drive shaft 29 at one end thereof is a fly or driving wheel 208 which is in the form of a hand wheel and has on its inner surface a belt engaging wheel or flange 209 for the reception and operation of a belt of any suitable kind used for connecting the drive wheel to a motor or other part for transmitting power to the same. As shown in Figure 3, the wheel 208 is provided in its inner face near the drive shaft with a plurality of openings 210 for the reception of bolts 211 screwed into the outer face of a collar 212, which collar is slidably mounted on a sleeve 213 fixed to the driving shaft. This sleeve has at its outer end an annular flange 214 which is perforated for the reception of the bolts or pins 211 and is interposed between the hand wheel 208 and the collar 212. The sleeve 213 is provided with a longitudinally extended recess 214$^a$ in which a screw or pin 215 extended from the collar 212 fits and thus permits of longitudinal movement of the collar 212 on said sleeve. By this arrangement it is manifest that very simple and convenient means is provided for throwing the means into and out of operative connection with the drive wheel, for instance, by moving the collar 212 inwardly from the position shown in Figure 3, it is clear that the clutch pins 211 will be disengaged from the openings 210 in the wheel, which operation will permit the rotation of the wheel without actuating the parts of the machine. By sliding the collar 212 in the opposite direction, it is manifest that the parts of the machine will be thrown into operative position.

What I claim is:

1. In a leather stitching machine, the combination with a hooked needle operating from the upper side of the work, a thread measuring finger disposed below the work, a thread thrower disposed below the work and mounted to swing about a vertical axis and have vertical bodily movement, means for intermittently swinging said thread thrower and for simultaneously raising and lowering the same whereby the thread will be engaged and retained by the measuring finger and for subsequently moving the thread thrower to position the thread in a position to be engaged by the needle.

2. In a leather stitching machine, the combination with a hooked needle operating from the upper side of the work, a thread measuring finger disposed below the work, a thread thrower disposed below the work, a vertical shaft on which said thread thrower is mounted, and cam controlled means for swinging said shaft to move the thread thrower, whereby the thread will be engaged and retained by the measuring finger, and for subsequently moving the thread thrower to position the thread in a position to be engaged by the needle.

3. In a leather stitching machine, the combination with a hooked needle operating from the upper side of the work, a thread measuring finger disposed below the work, a thread thrower disposed below the work, a vertical shaft on which said thread thrower is mounted, and cam controlled means for swinging said shaft to move the thread thrower, whereby the thread will be engaged and retained by the measuring finger, and for subsequently moving the thread thrower to position the thread in a position to be engaged by the needle, and means for raising said shaft and thrower while the latter is moving from one extreme position to the other, whereby the thread will be positioned above the hook of the needle when the latter is in its lowermost position.

4. In a leather stitching machine, the combination with a hooked needle operating from the upper side of the work, a thread measuring finger disposed below the work, a thread thrower disposed below the work, a vertical shaft on which said thrower is mounted, and cam-controlled means for swinging said shaft to move the thread thrower, whereby the thread will be engaged and retained by the measuring finger, and for subsequently moving the thread thrower to position the thread in a position to be engaged by the needle, and means for raising said shaft and thrower while the latter is moving from one extreme position to the other, whereby the thread will be positioned above the hook of the needle when the latter is in its lowermost position, said shaft raising means comprising an inclined track and a co-operating block carried by the shaft.

5. In a lock stitch machine, a stitch forming mechanism including a rotary hook, a bobbin case journaled therein, and means actuated by the thread loop carried by the hook to pull a fixed amount of thread from the bobbin.

6. In a lock stitch machine, a stitch forming mechanism including a rotary hook, a bobbin case journaled therein, and a fixed arm extending downwardly in front of said bobbin case, said case being formed with an outwardly extending rib which co-operates with the lower end of said arm and with the loop of thread carried by the hook to oscillate said case and pull a fixed amount of thread from the bobbin.

7. In a lock stitch machine, a stitch forming mechanism including a rotary hook, a bobbin case journaled therein, and a fixed arm extending downwardly in front of said bobbin case, said case being formed with an outwardly extending rib which co-operates with the lower end of said arm and with the loop of thread carried by the hook to oscillate said case and pull a fixed amount of thread from the bobbin, said rib extending beyond the edge of the case for engagement by said loop when the latter is being shed from the hook to return said case to its original position.

8. In a sewing machine, the combination with a rotary hook having a bobbin race, and a bobbin seated in said race, said bobbin being provided with a thread opening communicating with the race whereby the inner end of the bobbin thread will be directed between the race and the bobbin to create friction there-between to sufficiently retard the unwinding of the bobbin.

CHARLES F. MILLER.